United States Patent Office 3,236,174
Patented Feb. 22, 1966

3,236,174
SEALING APPARATUS
Harold D. Hutchinson and William C. Gregge, both of 1009 Montana Ave., Santa Monica, Calif.
Filed Aug. 7, 1963, Ser. No. 300,550
5 Claims. (Cl. 100—93)

This invention relates to sealing apparatus and more particularly, to a novel portable sealing apparatus designed for heat sealing different articles such as plastic bags.

In heat sealing articles such as plastic bags, the perimeter of the bag opening is heated under pressure so that the plastic material of the bag will melt to fuse the opening to a closed position. Automatic equipment for carrying out this operation usually takes the form of relatively bulky apparatus. For portable use, there have been provided clam shell type sealers in which jaws are closed on the peripheral portion of the plastic bag defining the opening, the jaws themselves being heated to melt the plastic and effect the desired sealing.

In all types of equipment heretofore available, separation of the jaws or sealing members from the article after sealing has resulted in some difficulty in that the melted plastic of the bag often adheres to the sealing members. Further, careful attention has had to be paid towards properly positioning the opening to be sealed with respect to the sealing apparatus. In this respect, wrinkles and the like must be removed from the bag to insure a proper seal. Moreover, the bag should not be under tension which is oftentimes the case is it is filled with articles to be sealed therewithin. If tension exists in the bag material, it may tend to disrupt the seal when the plastic is melted. While the seals will accommodate considerable tension after hardening, during the actual sealing of the bag itself it is important that no tension be present.

With the foregoing in mind, it is a primary object of this invention to provide a novel portable type sealer in which many of the problems encountered with presently available sealers such as outlined above are overcome.

More particularly, it is an object to provide a portable sealer which includes means for holding the sealed portion of the bag after the sealing operation has been completed so that a "stripping" of the sealing member from the bag may be effected without any damage to the bag. The means is such that the bag itself will be released only after the heating element has been separated.

Another important object is to provide an improved portable sealing apparatus including means for properly holding the portions to be sealed in such a manner as to remove any tension in the sealed areas during the sealing operation so that rupturing of the seal is substantially avoided.

Still other objects of this invention are to provide an improved sealing apparatus which is extremely simple to use and may be operated by one hand of an operator, is economical to build, is adaptable to various different types of articles, and which provides superior seals than comparable portable apparatus heretofore available.

Briefly, these and other objects and advantages of this invention are attained by providing a combination sealing member and holding means. The sealing member is resiliently mounted for movement with respect to the holding means in such manner that the heated sealing member is normally spaced from the holding means. In operation, the holding means first engages portions of a bag or other article to be sealed and the sealing member is then subsequently brought down into sealing engagement. When the sealing is completed the reverse of the foregoing steps takes place so that the sealing bar is first removed from the sealed area and then subsequently the holding member releases the sealed area.

With the foregoing arrangement, tension is not present in the material during the sealing operation. Further, by holding the sealed article after sealing has been completed for a sufficient length of time to permit the seal to harden, rupturing of the seal is avoided. Finally, the holding means cooperating with the heat sealing member itself is such that clean "stripping" of the bar away from the seal can be effected after the sealing has been completed.

A better understanding of the invention will be had by now referring to a preferred embodiment thereof as illustrated in the accompanying drawings, in which.

Figure 1:
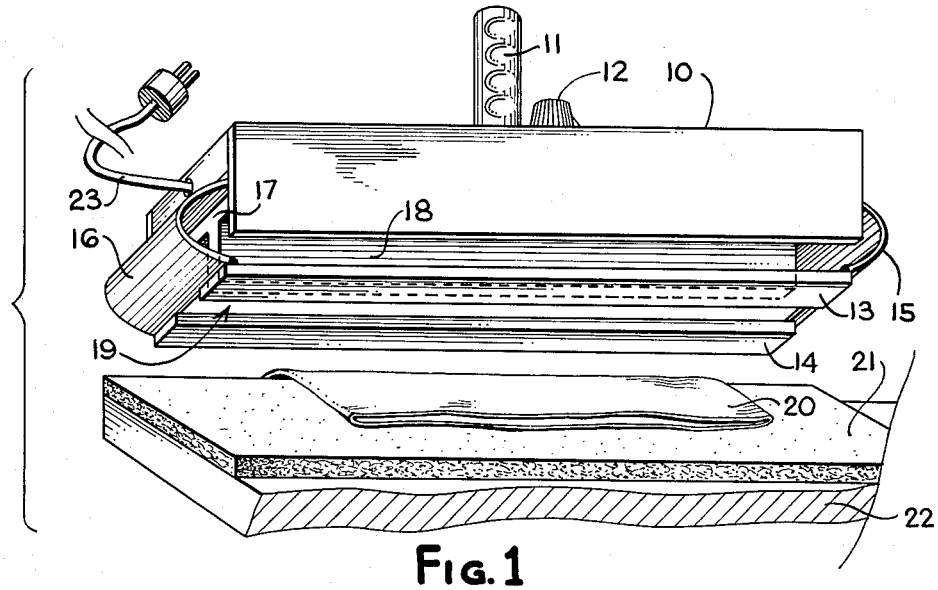
FIGURE 1 is a perspective view of the portable heat sealing apparatus of this invention preparatory to forming a seal on an article.

Referring first to FIGURE 1, the sealing apparatus comprises a housing 10 to which a convenient handle 11 may project for easy manipulation by one hand of an operator. Also projecting from the housing 10 is a small knob 12 for adjusting a suitable thermostat so that the heating of the sealing apparatus may be controlled.

As shown in FIGURE 1, the apparatus itself includes a pair of elongated flat plates 13 and 14 in co-planar side by side relationship. Support for these plates constitutes resilient means in the form of first and second leaf springs 15 and 16. The upper ends of these leaf springs connect to an elongated sealing member 17 having a general T-shape in cross-section. The web portion 18 of this T-shape terminates in a lower sealing end adapted to extend through a slot 19 defined between the plates 13 and 14.

As will become clearer as the description proceeds, suitable heating means are incorporated in the housing 10 for heating the elongated sealing member 17 so that when the web portion 18 projects through the slot 19 to engage an article, proper heat sealing can be effected.

In the operation of the structure described thus far, there is shown an article to be sealed such as a plastic bag 20. The opening of the bag 20 is shown resting on a resilient felt pad 21 on a table 22. In use, the sealing apparatus is electrically energized through inlet wire 23. The knob 12 may be used to control the temperature of the heating member. When proper temperature is attained, the apparatus is simply pressed into engagement with the bag 20. The elongated plates 13 and 14 serve as a holding means to remove any tension from the immediate area to be sealed. The web portion 18 of the sealing member will then project downwardly through the slot 19 against the bias of the leaf springs 15 and 16 to effect the desired seal.

Figure 2:
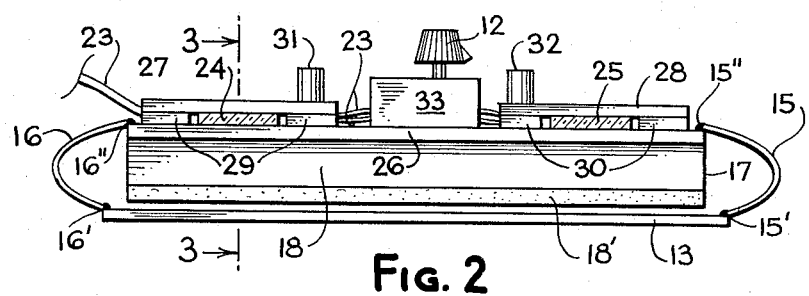
FIGURE 2 is a side elevational view of the sealing apparatus of FIGURE 1 with the cover removed.

Referring to FIGURE 2, further details of the structure are shown wherein it will be noted that suitable heating elements 24 and 25 are disposed directly on the surface on the cross-portion 26 of the T-shaped sealing member 17. As shown, these heating elements 24 and 25 are beneath plates 27 and 28 supported by spacer blocks 29 and 30. All of these members are made, for example, of aluminum which is highly heat conductive. Heat from the heaters 24 and 25 is thus conducted down to the sealing web 18 of the elongated sealing member. The covering members 27 and 28 also serve to support ceramic columns 31 and 32 to which the housing 10 of FIGURE 1 is fixed. The thermostat control knob 12 connects to a thermostat control 33. The lower sealing end of the web 18 is preferably coated with a plastic material 18' such as Teflon to lessen any tendency for the article to stick to the member.

It will also be noted in FIGURE 2, that the leaf springs have first ends secured to the opposite ends of the holding plates 13 and 14 as at 15' and 16'. The width of the leaf spring structure is such as to hold these plates in parallel space relationship to define the slot 19, this slot being wider than the thickness of the web.

The other ends of the leaf springs 15 and 16 terminate at 15" and 16" at the cross-portion 26 of the T-shaped elongated sealing member 17. The arrangement is such that the leaf springs bow outwardly in opposite directions as shown. Further, the stressing of the leaf springs will normally hold the sealing member 17 in a raised position so that its lower end is free of the slot 19 between the holding plates 13 and 14.

Figures 3, 4:
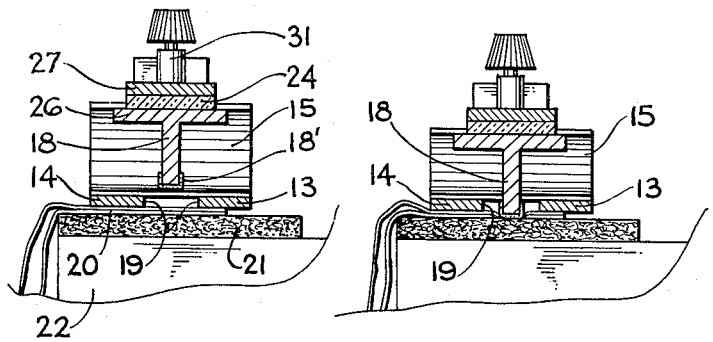
FIGURE 3 is an end cross section of the apparatus taken in the direction of the arrows 3—3 immediately prior to the effecting of a seal; and, FIGURE 4 is a view similar to FIGURE 3 illustrating the relative positions of the components making up the device during the actual sealing operation.

Referring to the cross-section of FIGURE 3, this latter position of the elongated sealing member 17 with respect to the holding plates 13 and 14 is shown.

FIGURE 4 illustrates the relative positions between the sealing member and holding plates 13 and 14 when a sealing operation is being carried out. As shown, the T-shaped sealing member 17 is urged downwardly by a pressing on the handle 11 of FIGURE 1 after positioning the plates 13 and 14 on an article such as the bag 20 to be sealed. This pressing downwardly tends to collapse the leaf springs 15 and 16 against their natural bias so that the lower end of the T-shaped sealing member 17 is brought into full surface contact with the bag portions to be sealed.

When the handle 11 is released, the springs 15 and 16 will urge the T-shaped sealing member 17 upwardly so that it will return to the position illustrated in FIGURES 2 and 3.

With respect to the foregoing, it should be noted that the plates 13 and 14 perform a very useful function in that they will hold the bag material in its initial position even after sealing and particularly while the T-shaped sealing member is being raised from the bag. Further, the clamping action of these members along opposite sides of the portion of the bag to be sealed will remove any tension during sealing which might otherwise act directly on the partions to sealed together.

Since the heated sealing member 17 does not touch the plates 13 and 14 and retracts upwardly when not in use, the device may rest on the plates without fear of fire or accidental burning when it is not being used to effect a seal.

From the foregoing description, it will be evident that the present invention has provided a greatly improved portable type sealing apparatus. Various changes falling within the scope and spirit of the invention will occur to those skilled in the art. The portable sealing apparatus is therefore not to be thought of as limited to the one embodiment set forth merely for illustrative purposes.

What is claimed is:

1. A portable sealing apparatus for sealing a portion of the marginal edges of an article comprising, in combination: first and second elongated flat plates disposed in side by side co-planar relationship to define an elongated slot opening of given width therebetween; an elongated sealing member having a lower sealing end resiliently supported above said plates so that said lower sealing end may be urged downwardly through said slot between said plates; and means for heating said member whereby said marginal edges of said article are held in position by pressing said plates thereagainst said given width being less than the width of said marginal edges, further pressure serving to lower said sealing end of said member through said slot to engage directly said portion of said marginal edges to be sealed and effect heat sealing thereof, said plates holding said marginal edges in stationary position when said sealing end of said member is raised.

2. An apparatus according to claim 1, in which said member has a T-shape in cross-section, the lower end of the web of said T-shape constituting said sealing end passing through said slot, said means for heating said member being mounted to the cross-portion of said T-shape, to provide heating of said sealing end by conduction through said member.

3. An apparatus according to claim 2, in which said sealing end includes a thin plastic coating to avoid adhering of said portion of said marginal edges of said article to be sealed to said sealing member.

4. An apparatus according to claim 3, including first and second leaf springs for resiliently supporting said elongated sealing member to said flat plates, said leaf springs having first ends secured to opposite ends of said plates and second ends secured to opposite ends of said member at the cross-portion of said T-shape, said leaf springs bowing outwardly on opposite sides of said sealing apparatus.

5. An apparatus according to claim 4, including a thermostat control connected to said heating means to enable the temperature of the lower sealing end of said member to be controlled.

References Cited by the Examiner

UNITED STATES PATENTS

| | | | |
|---|---|---|---|
| 2,638,964 | 5/1953 | Andina | 156—580 |
| 3,026,237 | 3/1962 | Gurvis | 156—583 |

EARL M. BERGERT, *Primary Examiner.*

DOUGLAS J. DRUMMOND, *Examiner.*